US005613065A

United States Patent [19]
Ishibashi et al.

[11] Patent Number: 5,613,065
[45] Date of Patent: Mar. 18, 1997

[54] INFORMATION BROADCASTING SYSTEM HAVING RECEPTION ERROR MINIMIZING FACILITY

[75] Inventors: Ryoichi Ishibashi; Tetsuo Tachibana; Tatsuru Nakagaki, all of Kawasaki, Japan

[73] Assignee: Fujitsu Limited, Kawasaki, Japan

[21] Appl. No.: 481,135

[22] Filed: Jun. 7, 1995

Related U.S. Application Data

[63] Continuation of Ser. No. 19,578, Feb. 18, 1993, abandoned.

[30] Foreign Application Priority Data

Feb. 19, 1992 [JP] Japan .................................. 4-031865
Mar. 19, 1992 [JP] Japan .................................. 4-063795

[51] Int. Cl.$^6$ ............................. G06F 11/00; G06F 11/34
[52] U.S. Cl. ...................... 395/185.01; 371/32; 371/35; 371/682; 395/182.16; 395/185.05; 395/185.1
[58] Field of Search ............................. 395/185.01, 180, 395/182.16, 183.15, 185.04, 185.05, 185.1; 371/32, 33, 34, 37.7, 69.1, 68.2

[56] References Cited

U.S. PATENT DOCUMENTS

| | | | |
|---|---|---|---|
| 3,732,541 | 5/1973 | Neubauer | 371/69.1 |
| 3,737,577 | 6/1973 | Birkin | 340/172.5 |
| 3,772,649 | 11/1973 | Haselwood et al. | 371/69.1 |
| 3,806,649 | 4/1974 | Jinguji et al. | 371/69.1 |
| 4,234,918 | 11/1980 | Chu et al. | 364/200 |
| 4,271,505 | 6/1981 | Menot et al. | 370/85 |
| 4,344,134 | 8/1982 | Barnes | 364/200 |
| 4,541,095 | 9/1985 | Vries | 371/69.1 |
| 4,567,595 | 1/1986 | Hedlund | 371/49.1 |
| 4,577,314 | 3/1986 | Chu et al. | 370/94 |
| 4,611,274 | 9/1986 | Machino et al. | 340/825.5 |
| 4,651,317 | 3/1987 | Toshiro et al. | 370/86 |
| 4,654,654 | 3/1987 | Butler et al. | 340/82.55 |
| 4,712,214 | 12/1987 | Meltzer et al. | 371/32 |
| 4,720,831 | 1/1988 | Joshi et al. | 371/37.2 |
| 4,742,512 | 5/1988 | Akashi et al. | 370/96 |
| 4,750,176 | 6/1988 | Von Veldhuizen | 371/32 |
| 4,763,329 | 8/1988 | Green | 371/11 |
| 4,766,599 | 8/1988 | Miyazaki | 375/8 |
| 4,868,866 | 9/1989 | Williams, Jr. | 380/49 |
| 4,908,828 | 3/1990 | Takalsky | 371/32 |
| 4,947,451 | 8/1990 | Narwata | 370/95.1 |

(List continued on next page.)

FOREIGN PATENT DOCUMENTS 1-218148  8/1989  Japan .

OTHER PUBLICATIONS

Robert H. Deng, Hybrid ARQ Schemes for Point-to-Multipoint Communication Over Nonrationary Boardcast Channels IEEE vol. 41, No. 9 pp. 1379–1387 (Sep. 1993).
M. R. Karim, Packetizing Voice for Mobile Radio/IEEE vol. 42 No. 2/3/4 pp. 377–385 (Feb.–Mar.–Apr. 1994).
S. R. chandran & S. Lim Selective-Repeat ARQ Schemes for Point-to-Multipoint Communications. IEEE Abs. ISTt '88 p. 135 (Jun. 1988).
Calo and M. C. Easton A Broadcasting protocol for file transfers to Multiple sites. IEEE Trans. Comm., COM–29, 11, pp. 1701–170 (Nov. 1984).

Primary Examiner—Robert W. Beausoliel, Jr.
Assistant Examiner—Dieu-Minh Le
Attorney, Agent, or Firm—Staas & Halsey

[57] ABSTRACT

Information selectively read out from an information source storing various types of information is repeatedly sent from a center office to a number of terminal equipment units with an error check code added on. The terminal equipment units use the error check code to detect if there is an error in the received information. If the information is received without error, the reception operation is ended for each terminal equipment unit. In this case, there is no interposition of a protocol for confirming if the transmission and reception of the information had been performed normally, so the load on the center office is lightened and it is possible for each of the terminal equipment units to receive the information without error.

21 Claims, 18 Drawing Sheets

U.S. PATENT DOCUMENTS

| | | | |
|---|---|---|---|
| 4,951,281 | 8/1990 | Muto et al. | 370/95.2 |
| 5,007,005 | 4/1991 | Hatakeyama et al. | 364/521 |
| 5,007,055 | 4/1991 | Isono et al. | 371/32 |
| 5,101,406 | 3/1992 | Messenger | 370/95.1 |
| 5,121,396 | 6/1992 | Irvin et al. | 371/20.2 |
| 5,163,056 | 11/1992 | Hagikawa et al. | 371/37.1 |
| 5,287,454 | 2/1994 | Diekmeier et al. | 395/200 |
| 5,299,194 | 3/1994 | Ichii et al. | 370/85.3 |
| 5,313,467 | 5/1994 | Varghese et al. | 370/94.1 |

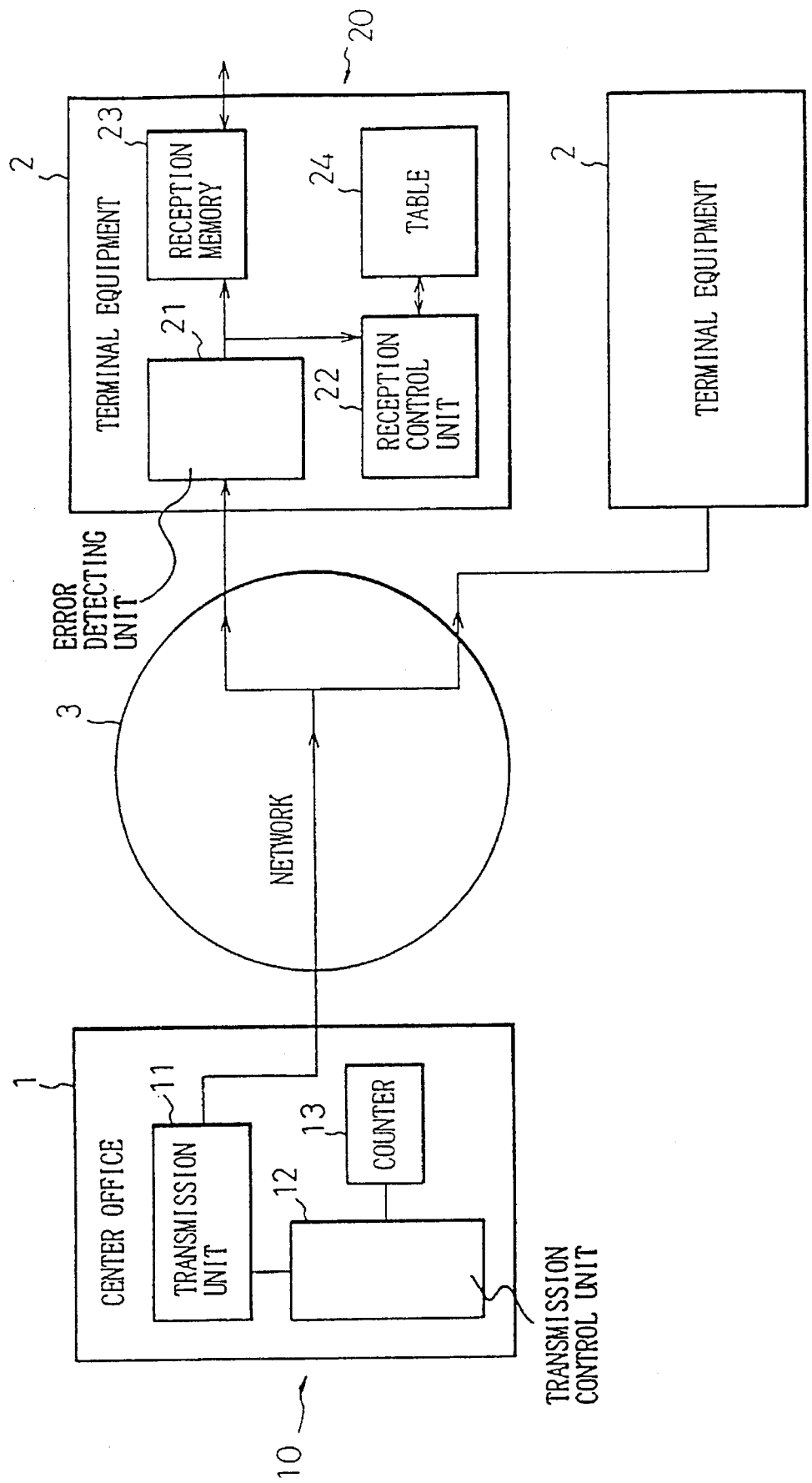

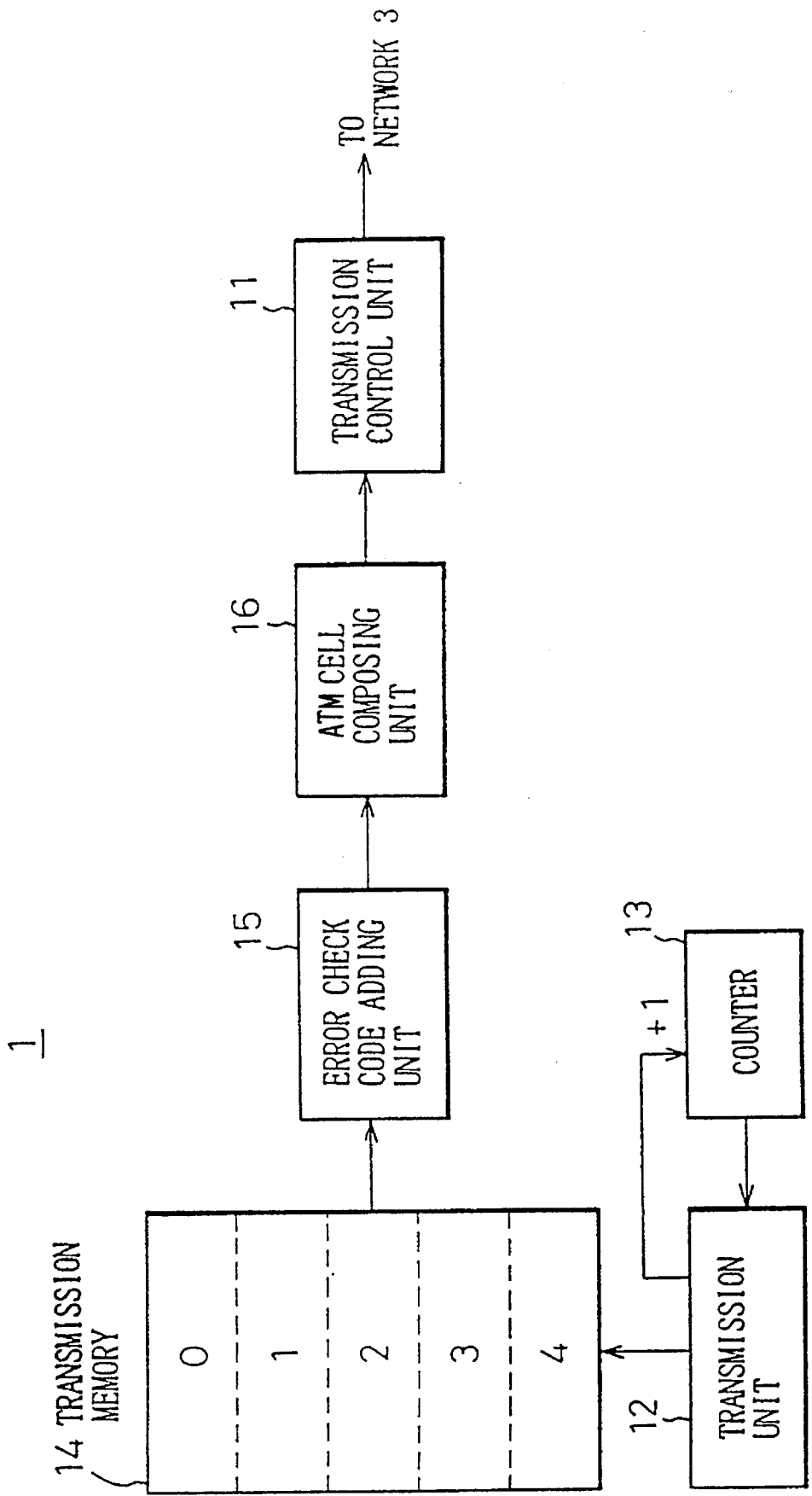

```
FROM          ATM              ERROR        OK/NG    BLOCK INFORMATION        →*1
NETWORK 3 →  DECOMPOSING  →    DETECTING  ─────────→ NUMBER DETECTING
              UNIT             UNIT                   UNIT
              29               27                     28
                                         NUMBER
                                         ↓ 22
                                    RECEPTION         WRITE/DISCARD  →*2
                                    CONTROL      ─────────────────→
                                    UNIT             WRITE INDICATION  →*3
                                         ↕ TABLE INFORMATION
                                    TABLE
                                    MANAGEMENT
                                    UNIT
                                    25
                                         ↕

BLOCK INFORMATION   RECEPTION STATE
  NUMBER              INDICATION FLAG
  0                   0/1
  1                   ---
  2
  ---

24 TABLE
```

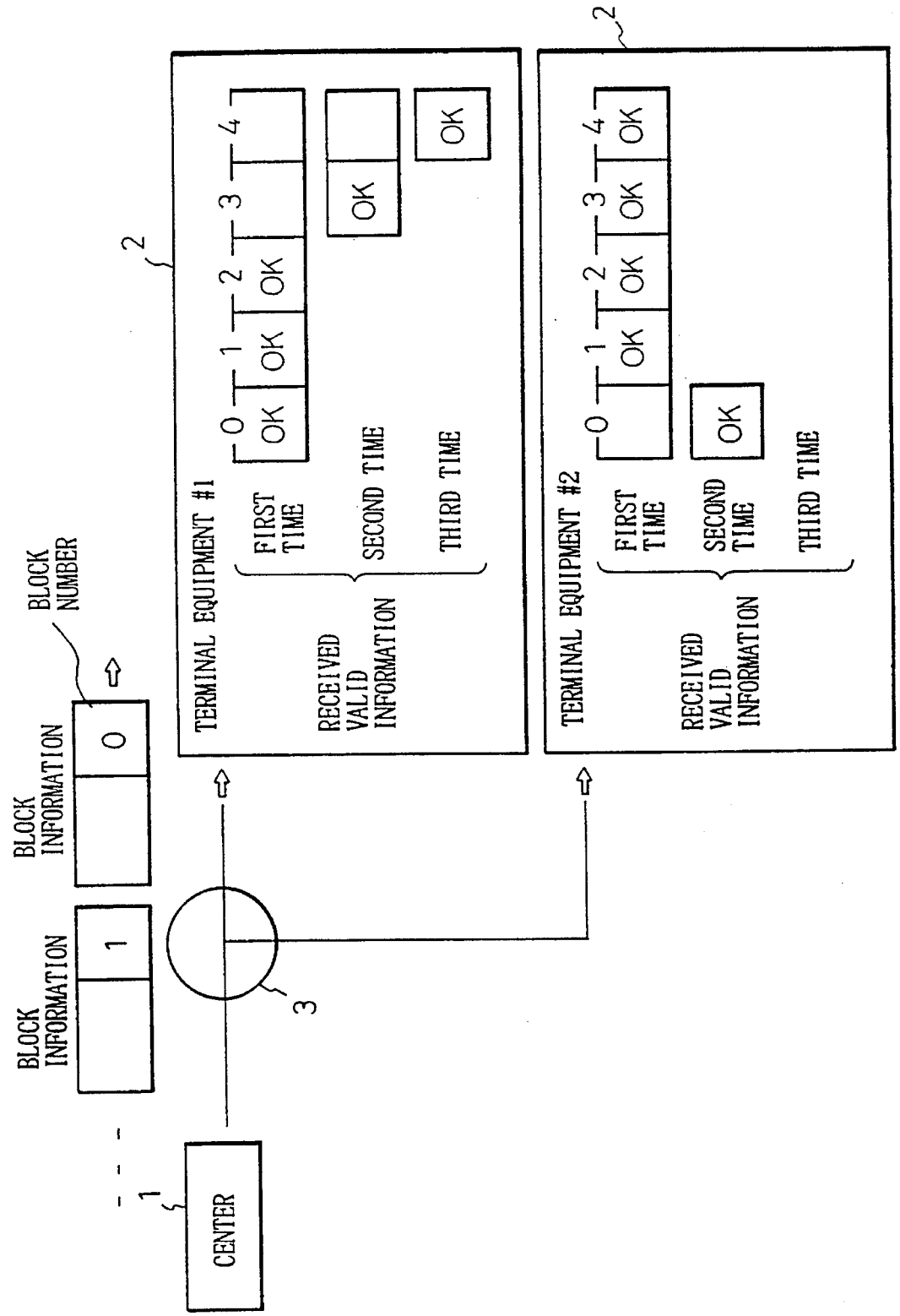

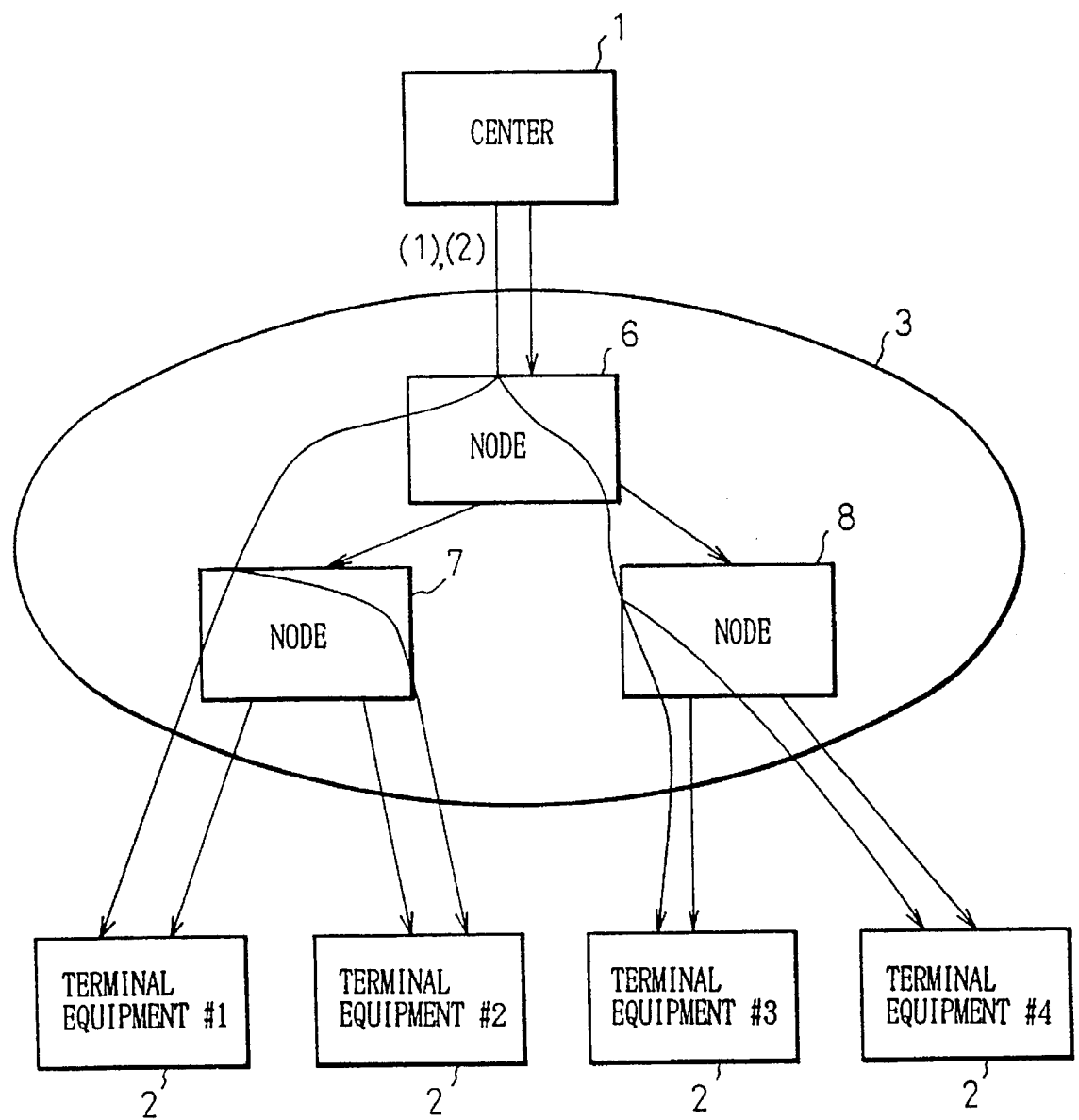

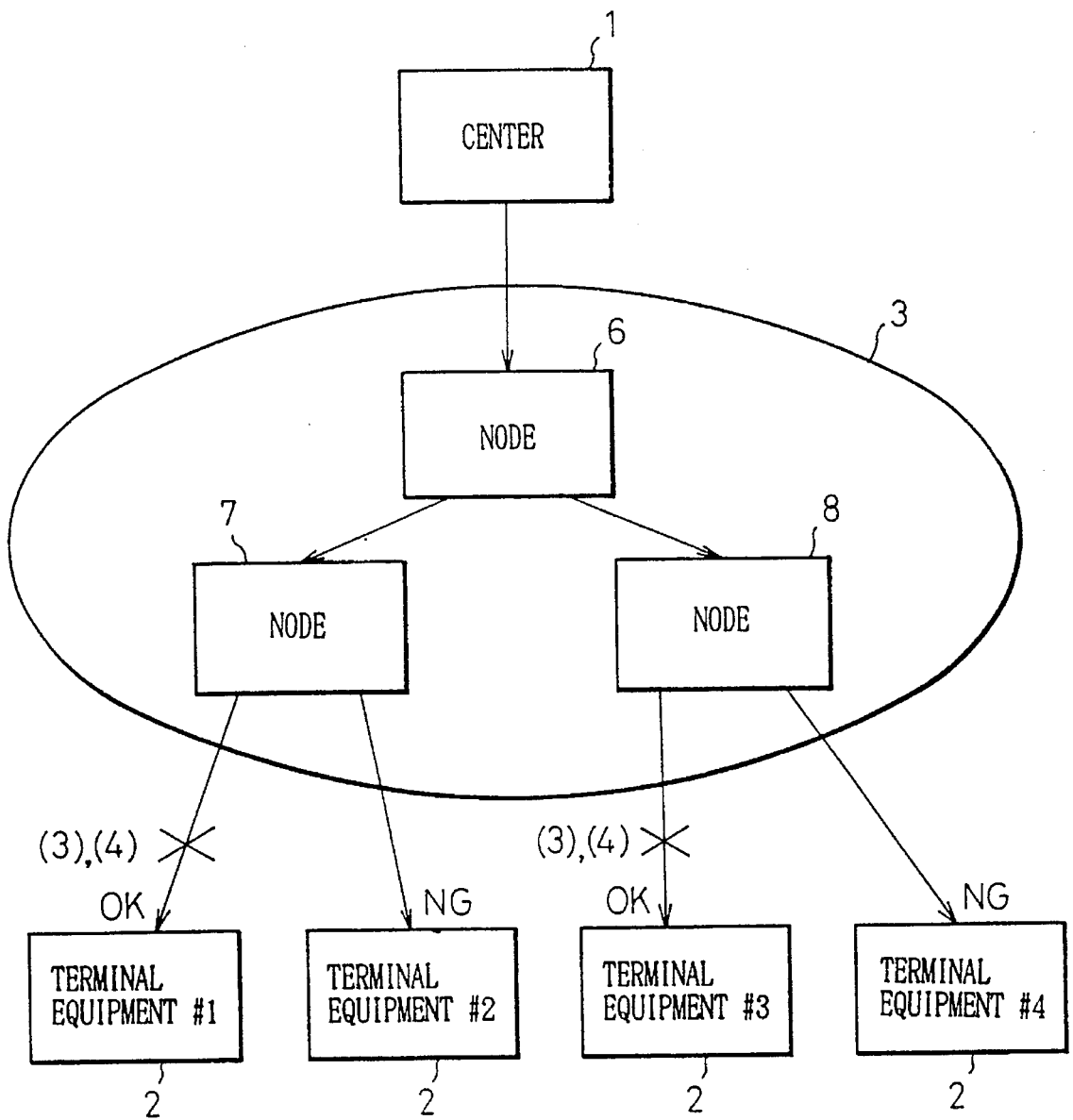

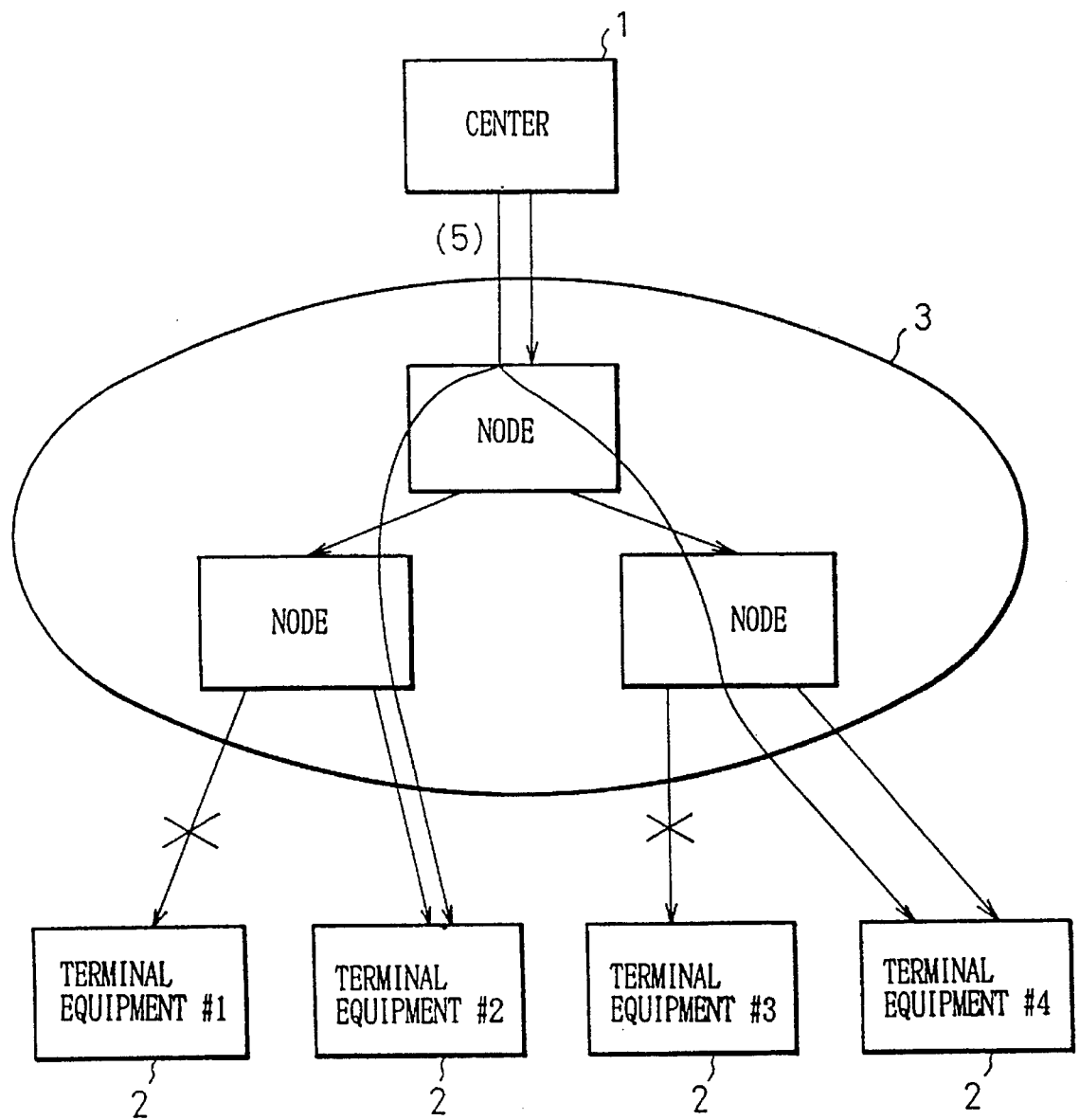

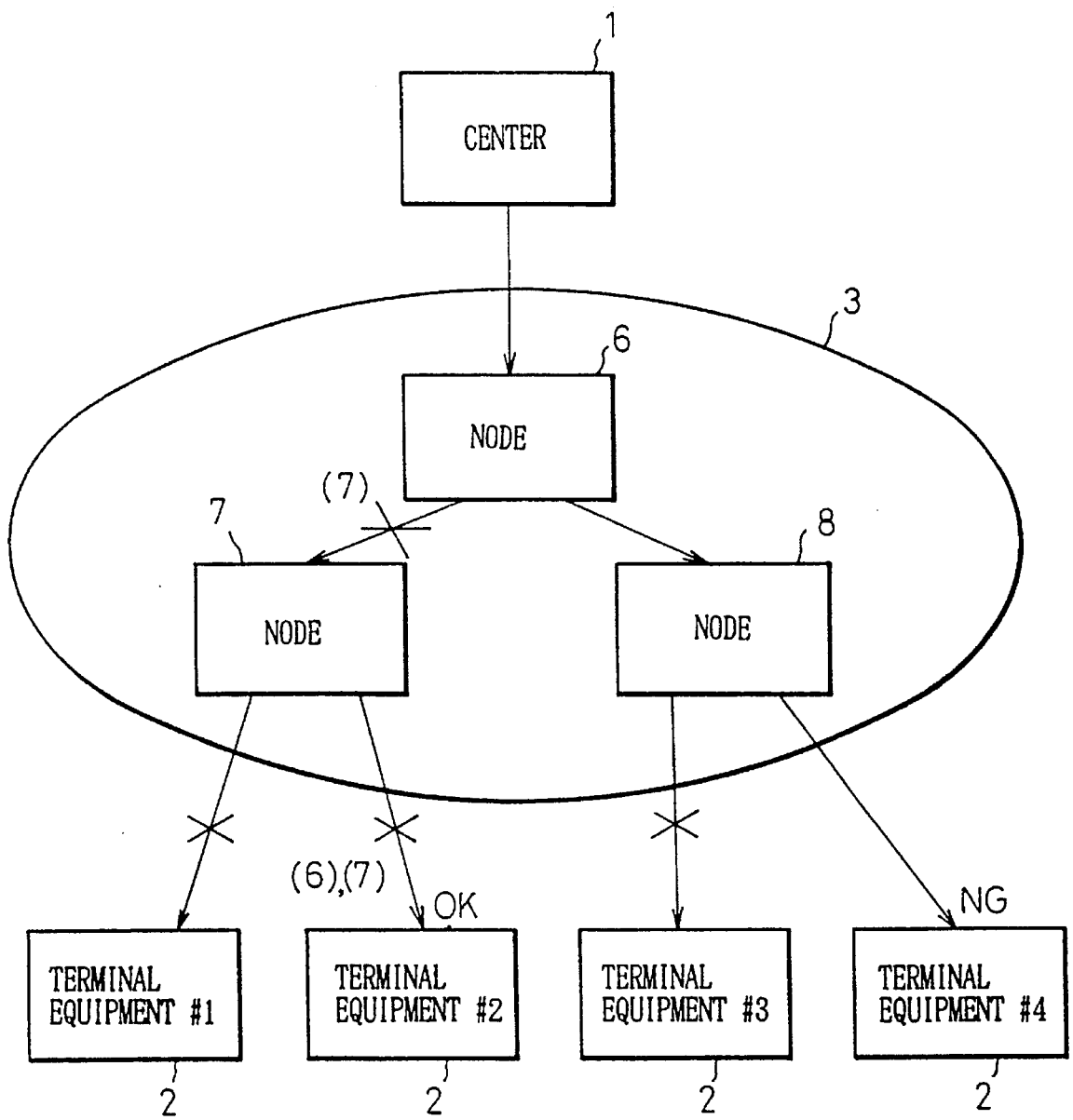

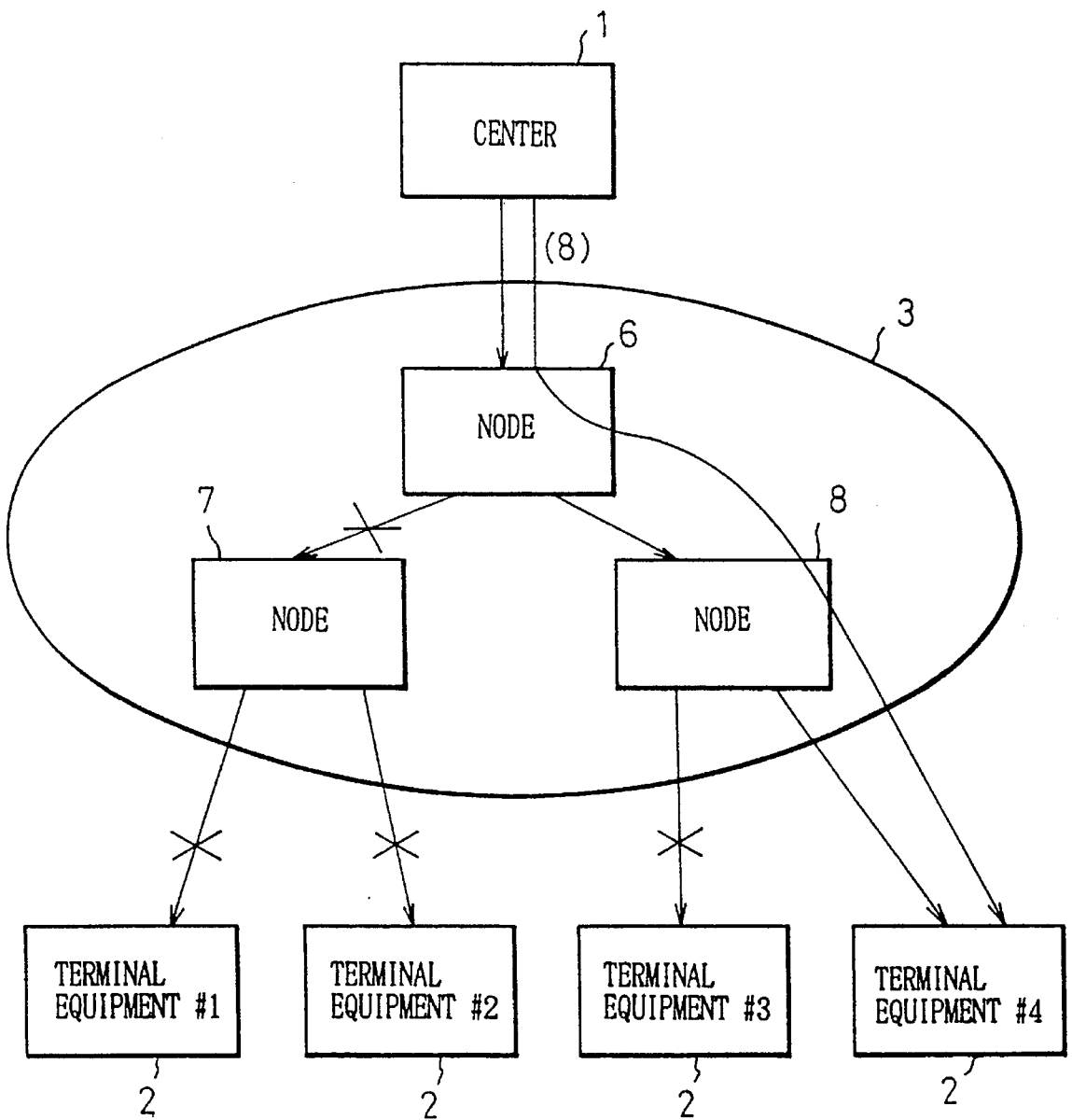

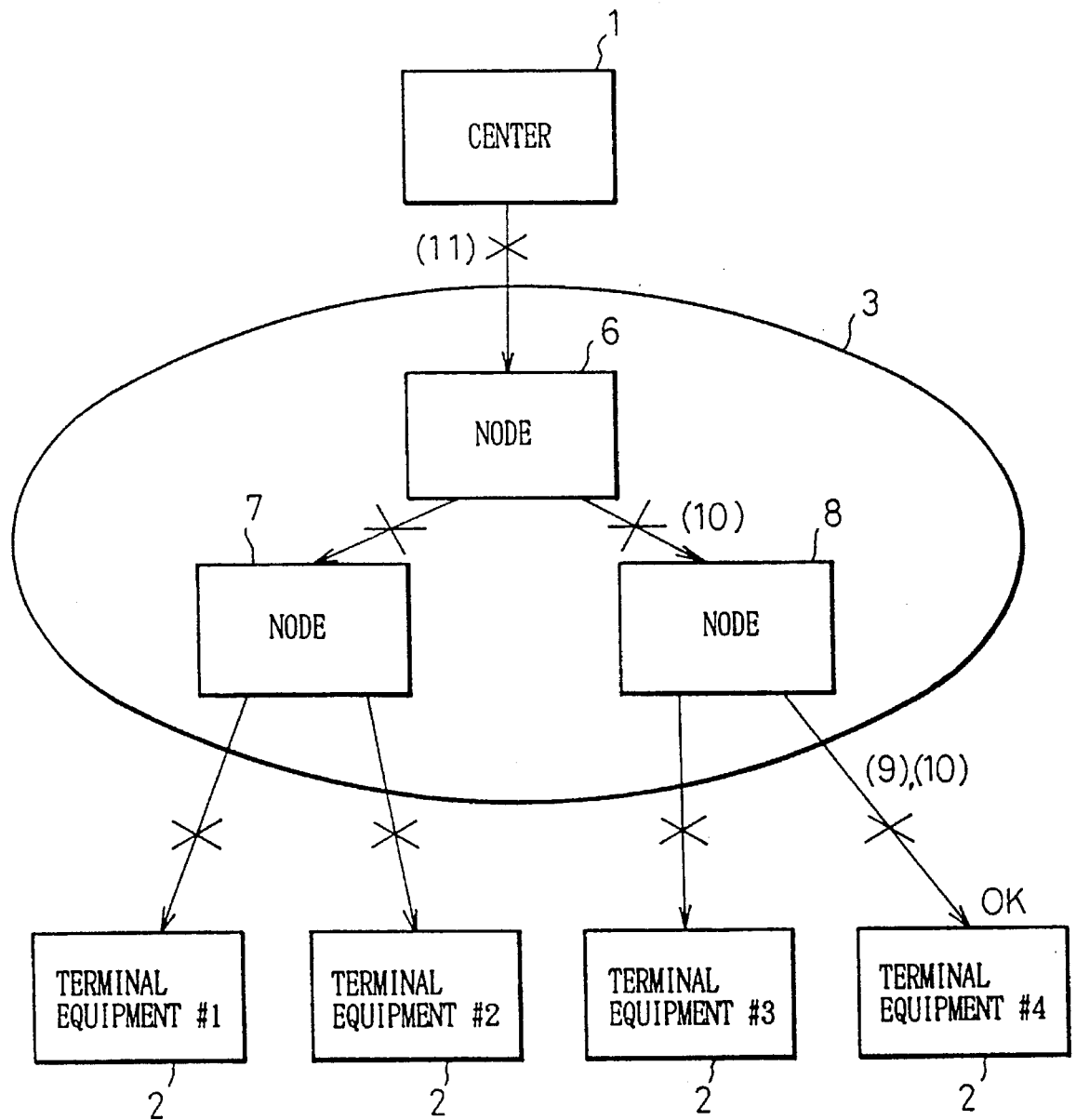

INFORMATION BROADCASTING SYSTEM HAVING RECEPTION ERROR MINIMIZING FACILITY

This application is a continuation, of application Ser. No. 08/019,578, filed Feb. 18, 1993, now abandoned.

BACKGROUND OF THE INVENTION

1. Field of the Invention

The present invention relates to an information broadcasting system wherein a center office and a plurality of terminal equipment units are connected in a point-to-multipoint format through a network and the same information is broadcast from the center office to the plurality of terminal equipment units, more preferably to an information broadcasting system which sends the same information from a center office to a plurality of terminal equipment units in a broadband ISDN network.

In recent years, much research has been going on into broadband ISDN networks. It is projected that services will be offered which broadcast large volumes of data, such as for example, newspapers and others of the same media, to a large number of contractors through a public telecommunications network.

2. Description of the Related Art

One means of providing such a service is to provide one or more center offices, the origin of the broadcast, and broadcast from there to a plurality of contractors through a public telecommunications network.

When trying to establish such a service based on this idea, in the past it had been considered to broadcast information simultaneously to all the contractors. However, but an increase of the number of the contractors leads to increasing chances that not all contractors will be able to receive the broadcast without error. Therefore, even if a single contractor experiences error in reception, it is necessary to retransmit the information to all the contractors. Any attempt to retransmit information with the existing methods, however, requires the use of a retransmission protocol between the contractors and the center office, making it necessary for the center office to deal with all the contractors and thereby ending up increasing the processing load tremendously.

Instead of using a retransmission protocol with all the contractors, there is also the technique of repeatedly sending the same information a number of times to all the contractors, but this repeated transmission method means that the same information is sent several times even to contractors who have received the information normally, which is not only wasteful, but also poses a problem in that there is no certainty that the information will be received normally by all contractors even with multiple transmissions.

SUMMARY OF THE INVENTION

Therefore, the present invention has as its object to provide an information broadcasting system which does not have to retransmit information to all contractors even if a reception error occurs in a single contractor. This lightens the load of the transmission processing at the center office, and ensures that the contractors' terminal equipment units can receive information reliably from the center office.

To attain the above object, the present invention repeatedly transmits to the terminal equipment units, information with an added error check code, without interposition of a protocol, in order to confirm if the provision of information with the contractors' terminal equipment units had been performed normally. The present invention ends the reception of information after confirming, using the error check code, that the information has been normally received for each of the terminal equipment units independently, without interposition of a protocol for confirming if the reception of information provided with the center office had been performed normally.

BRIEF DESCRIPTION OF THE DRAWINGS

The above object and features of the present invention will be more apparent from the following description of the preferred embodiments with reference to the accompanying drawings, wherein:

FIG. 3 is a view showing the principle and constitution of a first embodiment according to the present invention;

FIG. 4 is a view showing a detailed specific example of a center office 1 side in the first embodiment of FIG. 3;

FIG. 5 is a key to FIG. 5A–5B

FIGS. 5A and 5B are views showing a detailed specific example of the terminal equipment unit 2 side in the first embodiment of FIG. 3;

FIG. 6 is a view showing schematically an example of the operation in the first embodiment;

FIG. 12 is a view showing the state of broadcasting information to all terminal equipment units;

FIG. 13 is a view showing the state where information is received normally at the terminal equipment units #1 and #3 and the call is disconnected;

FIG. 14 is a view showing the state of broadcasting information only to the terminal equipment units #2 and #4;

FIG. 15 is a view showing the state where information is received normally at the terminal equipment unit #2 and the call is disconnected;

FIG. 16 is a view showing the state of broadcasting information only to the terminal equipment unit #4; and FIG. 17 is a view showing the state where information is received normally at the terminal equipment unit #4 and the call is disconnected.

DESCRIPTION OF THE PREFERRED EMBODIMENTS

Before describing the embodiments of the present invention, the prior art and the problems therein will be first described with reference to the related figures.

Figure 1:
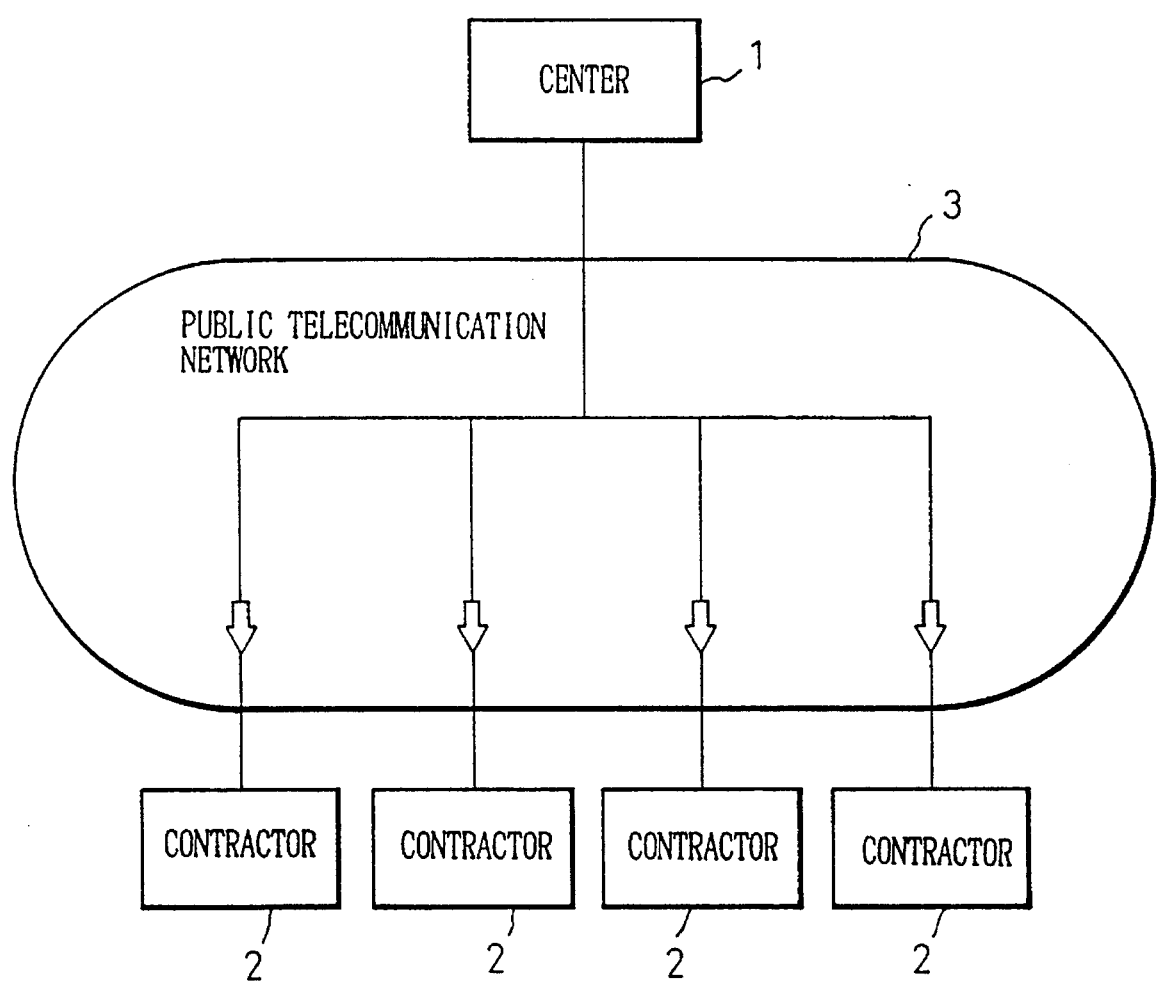
FIG. 1 is a view showing an example of an information broadcasting system using a public telecommunications network.

FIG. 1 is a view showing an example of an information broadcasting system using a public telecommunications network. In this example, a single center office 1 is connected to a public telecommunications network 3. Terminal equipment units 2, of a large number of contractors who have contracted to receive information services from the center office 1, are also connected to the public telecommunications network 3. When the center office 1 provides information to the terminal equipment units 2 of the contractors, it sets up calls with the individual contractors through the public telecommunications network 3 and can transmit by a point-to-multipoint format. In this case, when information is sent from the center office 1, it is received at each of the plurality of terminal equipment units of the contractors simultaneously.

This information broadcasting system has the advantage of high efficiency due to the simultaneous broadcasting of the same information to all contractors; however as the number of contractors increases, the chance rises that not all the information received at the terminal equipment unit 2 of the contractors will be free of error due to abnormalities in conditions of the transmission path in the public telecommunications network 3 or the terminal equipment units of the contractors.

To resolve this problem, it is required that a reception error minimizing facility be introduced into the information broadcasting system. If one attempts to realize this reception error minimizing facility based on conventionally known techniques, as mentioned earlier, when an error occurs, it is necessary to introduce protocol for a request for retransmission between the center office 1 and the terminal equipment units 2, whereupon there is the problem that the load on the center office 1 becomes extremely heavy.

Figure 2:
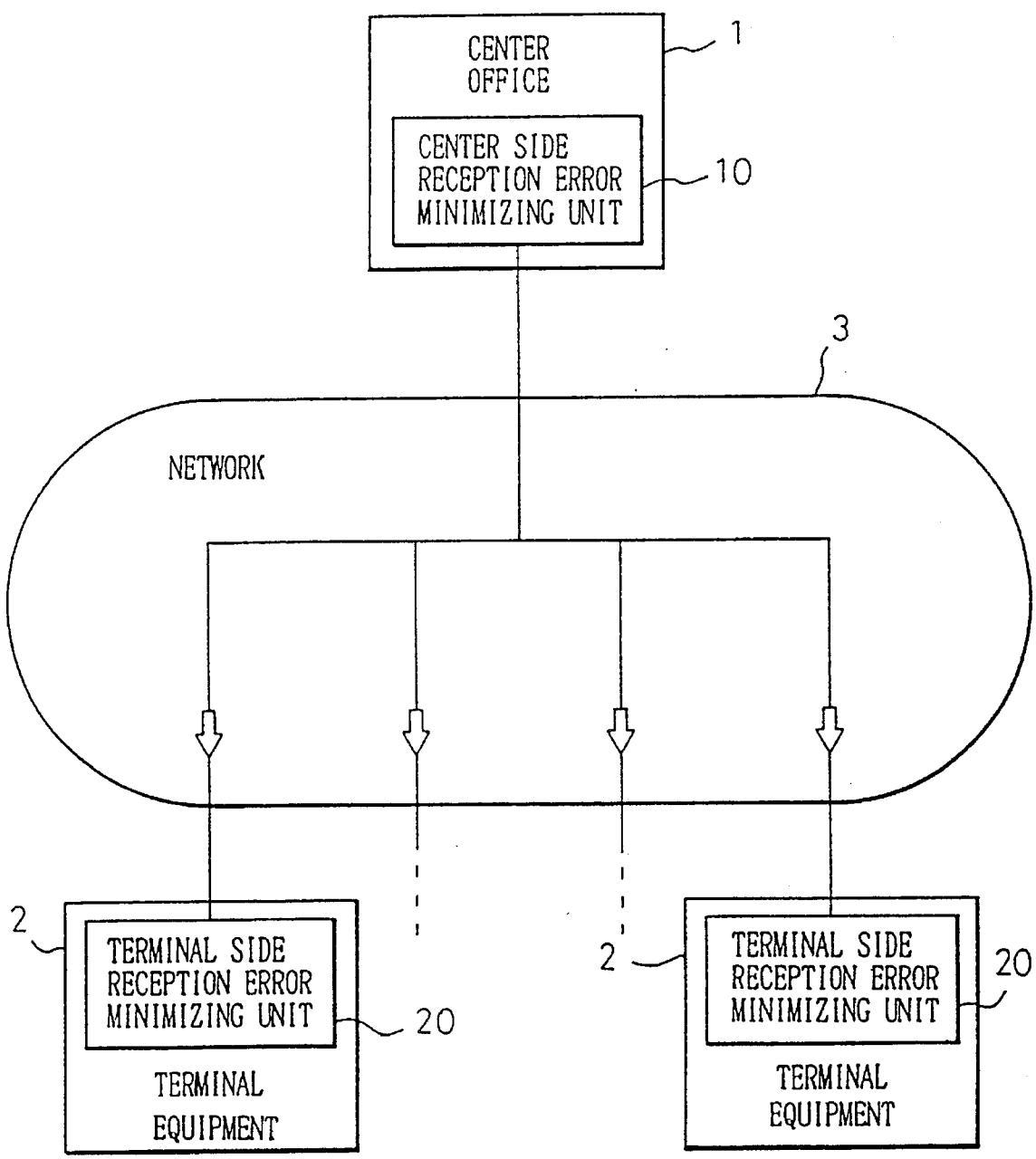
FIG. 2 is a view showing the principle and constitution of an information broadcasting system according to the present invention.

FIG. 2 is a view showing the principle and constitution of an information broadcasting system according to the present invention. In the figure, there is shown an information broadcasting system comprising a center office 1, which provides information selectively read out from a data base storing various types of information; and a plurality of terminal equipment units 2 which simultaneously receive the same information provided from the center office 1, through the network 3 by the point-to-multipoint format.

The reception error minimizing facility is comprised of a first means 10 (center side reception error minimizing unit) which is provided in the center office 1 and which repeatedly transmits to the terminal equipment units 2 information with an added error check code, without interposition of a protocol, for confirming if the information had been provided normally to the terminal equipment units 2; and a second means 20 (terminal side reception error minimizing unit) which is provided in each of the terminal equipment units 2 and which ends the reception of the information after confirming, using the error check code that the information has been normally received at the terminal equipment units 2 without the interposition of a protocol for confirming if the information provided from the center office 1 had been received normally.

FIG. 3 is a view showing the principle and constitution of a first embodiment according to the present invention. Generally speaking, the first means 10 is operative to successively read the information with the added error check code, repeatedly transmit it a predetermined number of times, then stop the transmission of the information when it is ended.

The second means 20 is operative to discard the received information when detecting that the information includes an error and to receive again the next transmitted information.

Explaining FIG. 3 in more detail, 1 is the center office, 2 is a transmission unit, 12 is a transmission control unit, 13 is a counter, 3 is a network, 2 is a terminal equipment unit connected to the network 3 and provided at a large number of contractors, 21 is an error detecting unit, 22 is a reception control unit, 23 is a reception memory, and 24 is a table storing the results of the error detection.

In the first embodiment of the present invention, information sent simultaneously from the center office 1 to the terminal equipment units 2 of the plurality of contractors is successively and repeatedly transmitted for a predetermined number of times. The terminal equipment units 2 of the contractors detect any error and store the results of the error detection. When not able to receive the information without error, they perform a reception operation again when receiving the next repetition of information. When they receive it normally, they end the reception operation.

After the center office 1 sets up transmission paths of a point-to-multipoint format with the terminal equipment units 2 of the plurality of contractors through a public telecommunications network or other network 3, it starts the transmission. Using the transmission control unit 12 of the center office 1, the information stored inside the transmission unit 11 is read out and transmitted. An error check code is added to the transmitted information. The transmission control unit 12 receives as input, in advance, a number of repetitions in accordance with the characteristics etc. of the network 3 and is set with the same. After one transmission of information ends, the counter 13 is incremented or decremented and the transmission unit 11 is made to start transmission again. This operation is repeated until the counter 13 reaches the preset number of repetitions of transmission, after which the transmission control unit 12 stops the transmission.

The terminal equipment units 2 on the contractor side run checks in the error detecting unit 21 after receiving transmission information from the center office 1 and successively store the information in a reception memory 23 under the control of the reception control unit 22. The results of detection of the error in the error detecting units 21 are supplied to the reception control unit 22, whereupon the reception control unit 22 stores the results in a table 24. When a single package of information is transmitted divided into a plurality of groups, the results of error detection corresponding to block numbers are stored successively in the table 24.

The reception control unit 22 receives the transmitted information sent the second time after finishing reception of the first transmitted information. When no error is detected the first time after reference to the table 24, there is no operation to store the results of the error detection for the second transmitted information in the table 24 or control to store the received information in the reception memory 23. When the transmitted information is comprised of a plurality of blocks, if there is a block for which an error was detected the first time, the information of the block number for which the error was detected is stored in the reception memory 23 and the results of the error detection are stored in the table 24 when the second transmitted information is received. When an error detection state is displayed in the table 24 even with the reception of the second transmitted information, the same processing is performed when the third information is received. The reception operation is ended when the error detection state is eliminated.

Figure 5B:
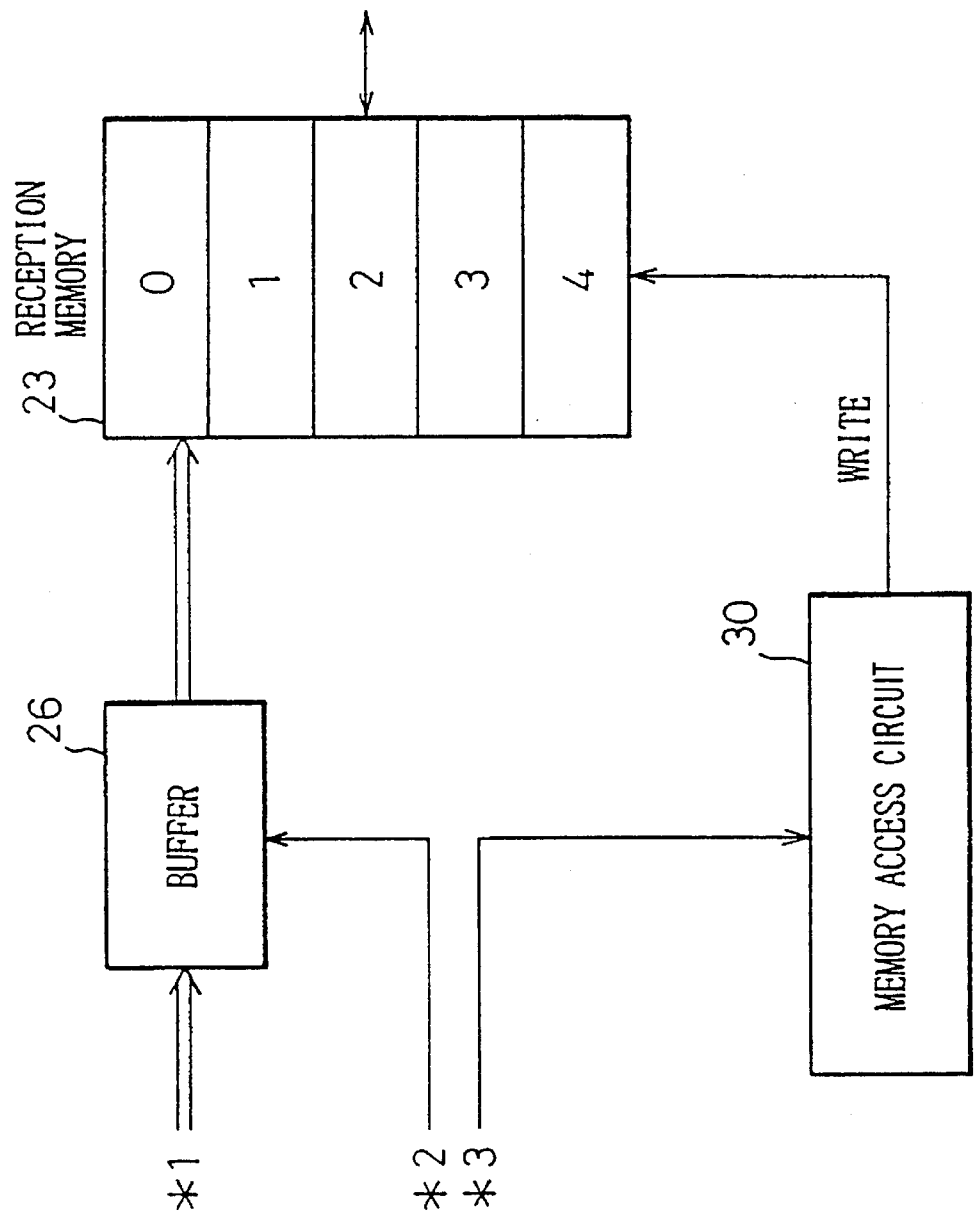

FIG. 4 is a view showing a detailed specific example of a center office 1 side in the first embodiment of FIG. 3; FIGS. 5A and 5B are views showing a detailed specific example of the terminal equipment unit 2 side in the first embodiment of FIG. 3; and FIG. 6 is a view showing schematically an example of the operation in the first embodiment. Note that in these specific examples, application is to a broadband ISDN network operating under an synchronous transfer mode (ATM) as the network 3.

In the center office 1 shown in FIG. 4, 14 is a transmission memory, 12 is the transmission control unit or transmission unit, 13 is the counter, 15 is an error check code adding unit, 16 is an ATM cell composing unit, and 11 is the transmission control unit.

Explaining the operation now, assume that a point-to-multipoint call setting is made through the broadband ISDN network 3 for all the contractors (2) contracting for transmission of information from the center office 1. The transmitted information is stored in the transmission memory 14 of the center office 1 divided into five blocks 0 to 4. The transmission control unit 12 is set with the number of repetitions of the transmission (C). The number of repetitions of transmission is set based on a communication quality of network 3 and the statistical data.

Information of the transmission memory 14 is successively read out by the transmission control unit 12. The block numbers are included in the information of the blocks. The information which is read out is given an error check code (parity, CRC code, etc.) by the error check code adding unit 15 in block units and supplies the result to the ATM composing unit 16. At the ATM cell composing unit 16, a header (5 octets) is added. The information is assembled into cells of a total 53 octets and sent from the transmission unit 11 to the public broadband ISDN network 3.

The transmission control unit 12 increments or decrements the counter 22 when the transmission of the information of all the blocks of the transmission memory 14 is completed (the figure illustrates the example of incrementation (+1)), then the second transmission operation is started. The operation is repeated until the counter reaches C or zero, whereupon the transmission is stopped.

The transmitted information is received by the terminal equipment units 2 on the contractor side, shown in FIGS. 5A and 5B, through transmission paths of calls set up by the broadband ISDN network 3.

In FIGS. 5A and 5B, 29 is an ATM cell decomposing unit, 27 is the error detecting unit, 28 is a block information number detecting unit, 26 is a buffer, 23 is the reception memory for storing the block information of the blocks 0 to 4, 22 is the reception control unit, 25 is the table management unit, 24 is the table, and 30 is a memory access circuit.

The ATM cells received from the network 3 are decomposed at the ATM cell decomposing unit 29, the headers are removed, the original information is converted to, and that information is input to the error detecting unit 27. There, error detection is performed. When the information is received normally, "0", indicating normality, is output to the reception control unit 22, while when an error is detected, "1", indicating an error, is output. The results of the error detection are provided to the reception control unit 22. The received information passing through the error detecting unit 27 is subjected to detection of the block numbers at the block information number detecting unit 28, and the detected numbers are provided to the reception control unit 22. The received information passing through the block information number detecting unit 28 is stored in the buffer 26.

The reception control unit 22 judges the state of the reception state indication flags of the corresponding block numbers in the table management unit 25 based on the results of detection of the error detecting unit 27 and the results of detection of the block numbers from the block information number detecting unit 28 and performs control for writing or not writing the information of the buffer 26 in the reception memory 23. More specifically, the table management unit 25 manages the table 24. The table 24 is provided with reception state indication flags corresponding to the block numbers. The reception state indication flags are written or read by the table management control unit 25. "1" is written in the case of normal reception, while "0" is set in the case of the initial state or detection of error.

The reception control unit 22 reads the reception state indication flags of the block numbers through the table management unit 25 when receiving a signal of normal reception. When the reception state indication flags are "0", the information stored in the buffer 26 is written in the reception memory 23 by issuing a command to the buffer 26 to write in the memory (read out from the buffer 26) and issuing the block numbers and write command to the memory access circuit 30.

The memory access circuit 30 performs writing of the data of the buffer 26 in the blocks (block numbers) in the memory 23 corresponding to the data of the buffer 26. The reception control unit 22 rewrites to "1" the reception state indication flags corresponding to the relevant block numbers of the table 24.

When an error is detected by the unit 27, a command is issued to discard the information having that block number in the buffer 26 and that information is not written into the reception memory 23. Nothing is written in the table 24 either.

In this way, when information is first transmitted from the center office 1, if the information has been received normally for all the block numbers, the flag is set to "1", while if an error is detected, "0" is set (nothing is written).

When the first information finishes being received and the second information sent from the center office 1 comes in, if the output of the error detecting unit 27 indicates normal reception, the reception control unit 22 judges the state of the reception state indication flags of the corresponding block numbers in the table 37 using the block numbers from the block information number detecting unit 28. Only if the flag is set to "0" is a write command issued to the memory access circuit 30. More specifically, control is performed so that only the block information of the block numbers which could not be normally received up to the previous reception operation is stored in the reception memory 23. The block information of the block numbers which could be received normally before and the information for which error has been detected are all discarded from the buffer 26.

In short, the second means 20 includes a buffer 26 which is disposed before the reception memory 23 storing the information to be supplied corresponding to the blocks and is operative to (i) write in the reception memory 23 the block information temporarily stored in the buffer 26 when there is no error in the received block information and the corresponding reception state indication flag shows that the block information has not yet been normally received and (ii) discard the block information when there is an error in the received block information or the corresponding reception state indication flag shows that the block information has been already normally received.

Next, an explanation will be made of an example of the operation referring to FIG. 6. In this example, the center office 1 prepared with the structure shown in the specific example of FIG. 4 is connected to two units, that is, the contractor terminal equipment unit #1 and the contractor terminal equipment unit #2, provided with the structure shown in FIGS. 5A and 5B, through the network 3. If information comprised of the five blocks 0 to 4 is sent from the center office 1, at the contractor terminal equipment unit #1, the three blocks 0 to 2 are normal in the first reception operation. In the second reception operation, the block no. 3 is received normally, while in the third reception operation, the block no. 4 is received normally. Therefore, reception of all the blocks is completed with a total of three reception operations.

On the other hand, for the contractor terminal equipment unit #2, the block nos. 1 to 4 are received normally at the first reception operation, while the block no. 0 is received normally at the second operation, so all the blocks are normally received with a total of two reception operations.

The above specific example was explained using the example of a broadband ISDN network, but it is clear that the invention can be used based on same principle, in other networks as well.

As explained above, according to the first embodiment of the present invention, it is possible to realize a system for broadcasting various types of information through the network 3 by a point-to-multipoint format without the use of a retransmission protocol which entails complicated control and requires an extensive amount of time. Further, it is possible to simply deal with the occurrence of error. By this, it is possible to reliably broadcast error-free information to a large number of contractors at a certain degree of high speed and possible to improve the quality of the broadcasting system.

Figure 7:
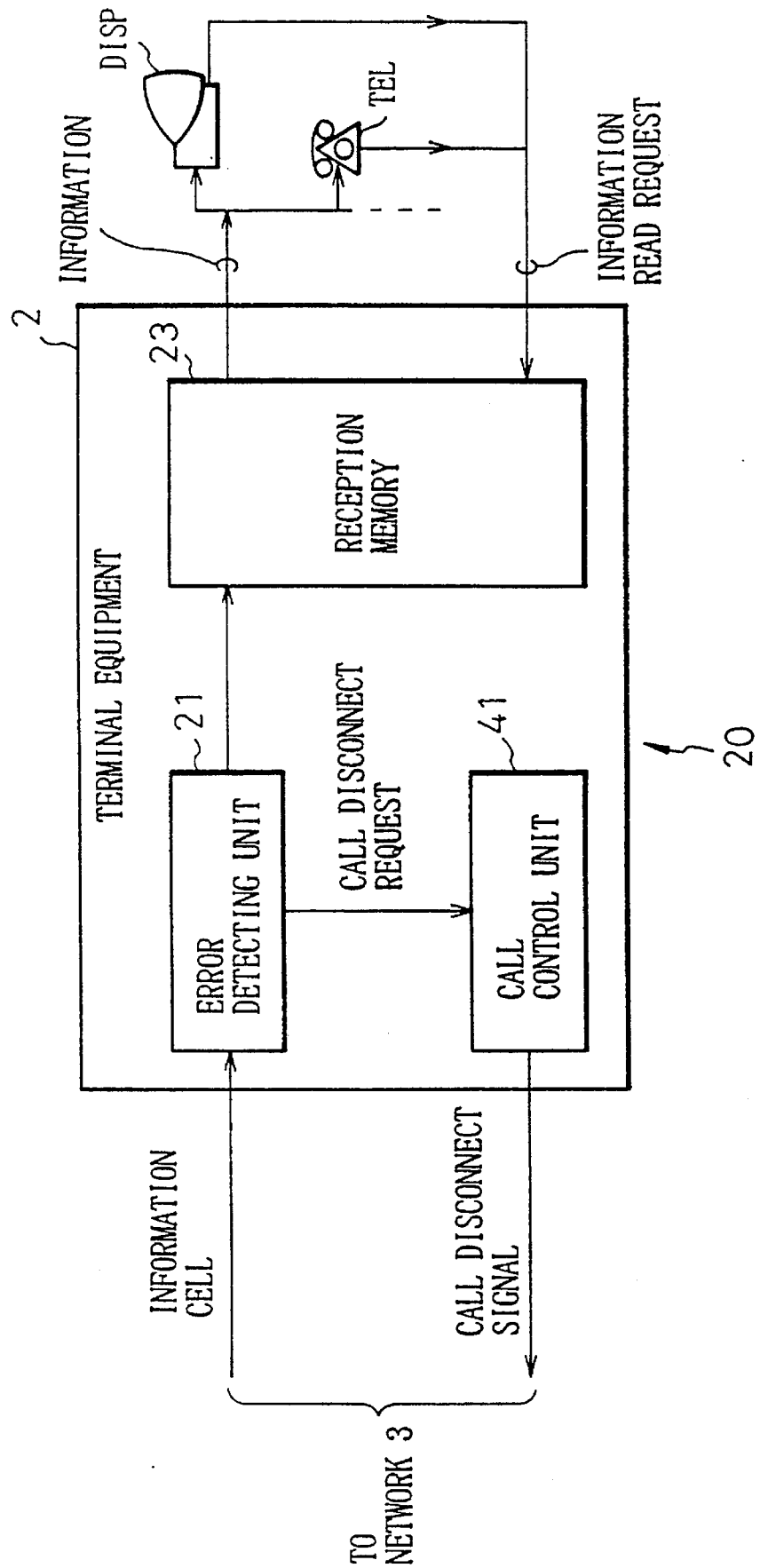
FIG. 7 is a view showing the constitution of the terminal equipment unit 2 side in a second embodiment according to the present invention.

FIG. 7 is a view showing the constitution of the terminal equipment unit 2 side in a second embodiment according to the present invention. Generally speaking, the second means 20 in the second embodiment is comprised of an error detecting unit 21 which uses the error check code to detect if the information has been normally received and a call control unit 41 which controls the setup of the call to be connected with the center office 1 and is operative to issue a call disconnect request to the call control unit when the error detecting unit 21 confirms that the information has been normally received and thereby cuts the call connection with the center office 1.

In this case, when the fact that the information has been normally received is confirmed, the information is stored in the reception memory 23. Note that the reception memory 23 is connected to, for example, a display "DISP", a digital telephone set "TEL", etc. When an information read request is issued from them, the stored information is supplied to the same.

The center office 1 repeatedly transmits the same information to the terminal equipment units 2 with which the calls have not yet been disconnected until receiving call disconnect signals from all the terminal equipment units 2.

First, calls are set up from the center office 1 to all the contractors by the point-to-multipoint format. When the calls are set up, the center office 1 repeatedly and successively sends information to all the contractors. At this time, no retransmission protocol is carried out between the center office 1 and the contractors. Information is sent one-way at least once from the center office 1 to the contractors.

The terminal equipment units 2 of the contractors perform error detection on the information received from the center office 1. When no error is detected, the information is stored in the memory 23 and the call with the network 3 is disconnected.

At this time, a terminal equipment unit 2, detecting an error in the received information, does not disconnect the call, but detects error again in the information next sent from the center office 1.

When all the terminal equipment units 2 correctly receive the information and the calls with all contractors are disconnected, the center office 1 ends the transmission of information.

In this way, when broadcasting information such as newspapers, it is possible to correct transmit information to all contractors (2) without a retransmission protocol between the center office 1 and the contractors (2).

Figure 8:
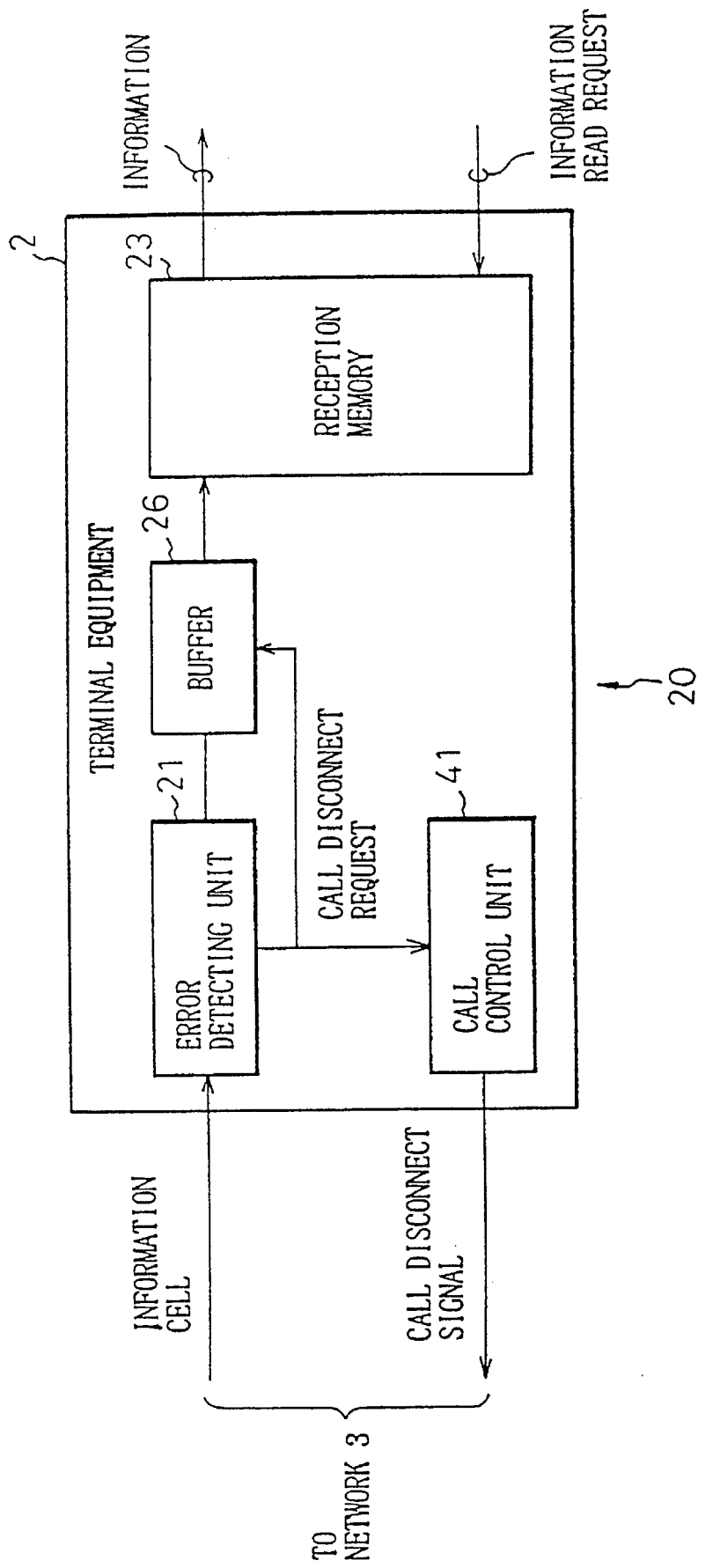
FIG. 8 is a view showing an example specifying further the construction of FIG. 7.

FIG. 8 is a view showing an example specifying further the construction of FIG. 7. The difference from the construction of FIG. 7 lies in the buffer 26. That is, the second means 20 includes a buffer 26 which is disposed in front of a reception memory 23 storing the information to be provided. The buffer 26 writes the information temporarily stored in the buffer 26 in the reception memory 23 when there is no error in the information received from the error detecting unit 21 and discards the received information temporarily stored in the buffer 26 when there is an error in the information.

Figure 9:
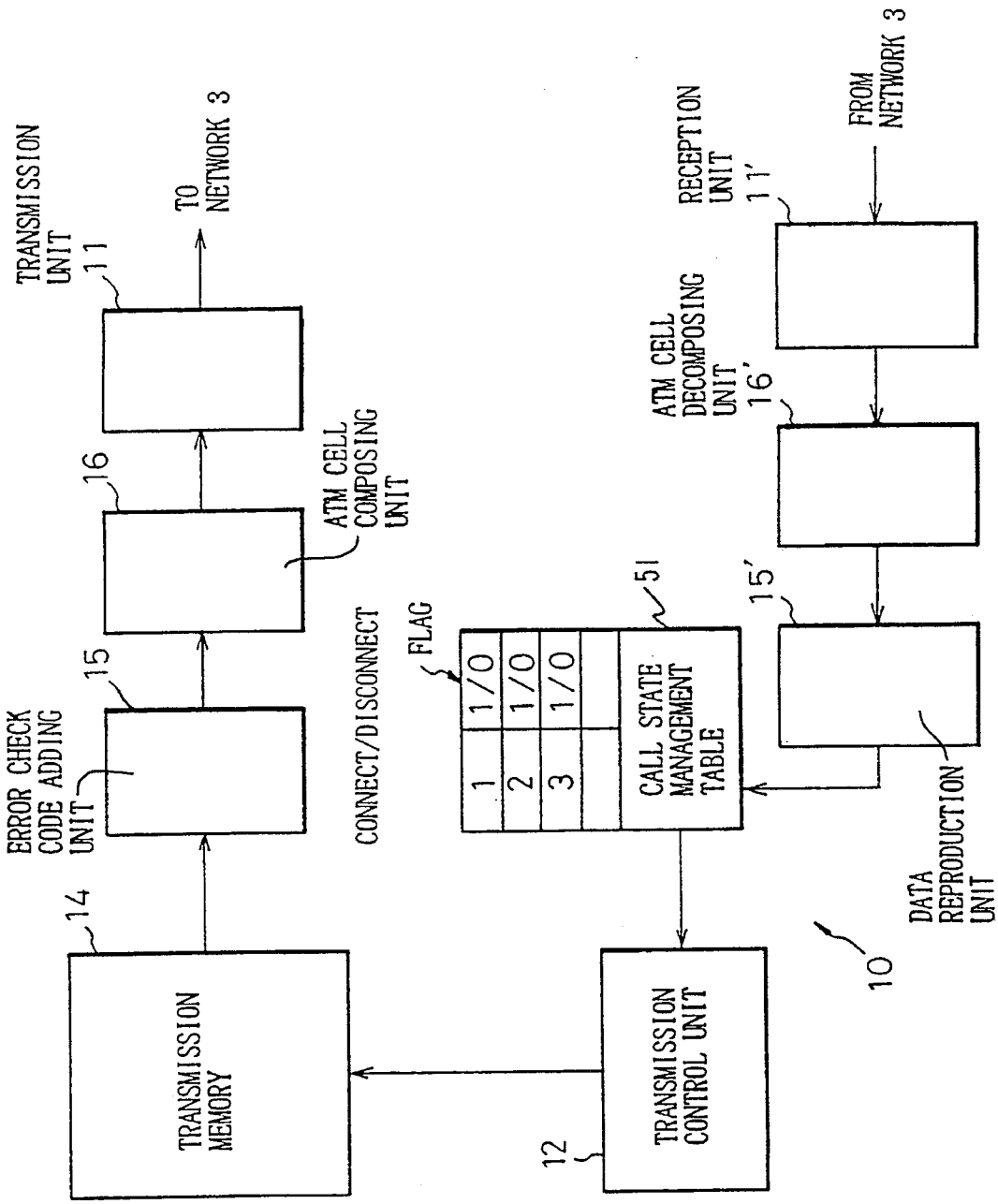
FIG. 9 is a view showing a detailed specific example of the center office 1 side in the second embodiment of the present invention.

FIG. 9 is a view showing a detailed specific example of the center office 1 side in the second embodiment of the present invention. Of particular note in the figure is the following: The first means 10 shown in the figure includes a call state management table 51 which records flags showing the presence of a call disconnection in one-to-one correspondence with all of the terminal equipment units 2 receiving the supply of the information and is operative to rewrite the flag in the call state management table to the flag "0" showing completion of call disconnection every time a call disconnect signal is received based on a request for call disconnection from a terminal equipment unit 2. Note that when the network 3 is an ISDN network, the call disconnect signal is sent from the terminal equipment units 2 as an ATM cell.

Figure 10:
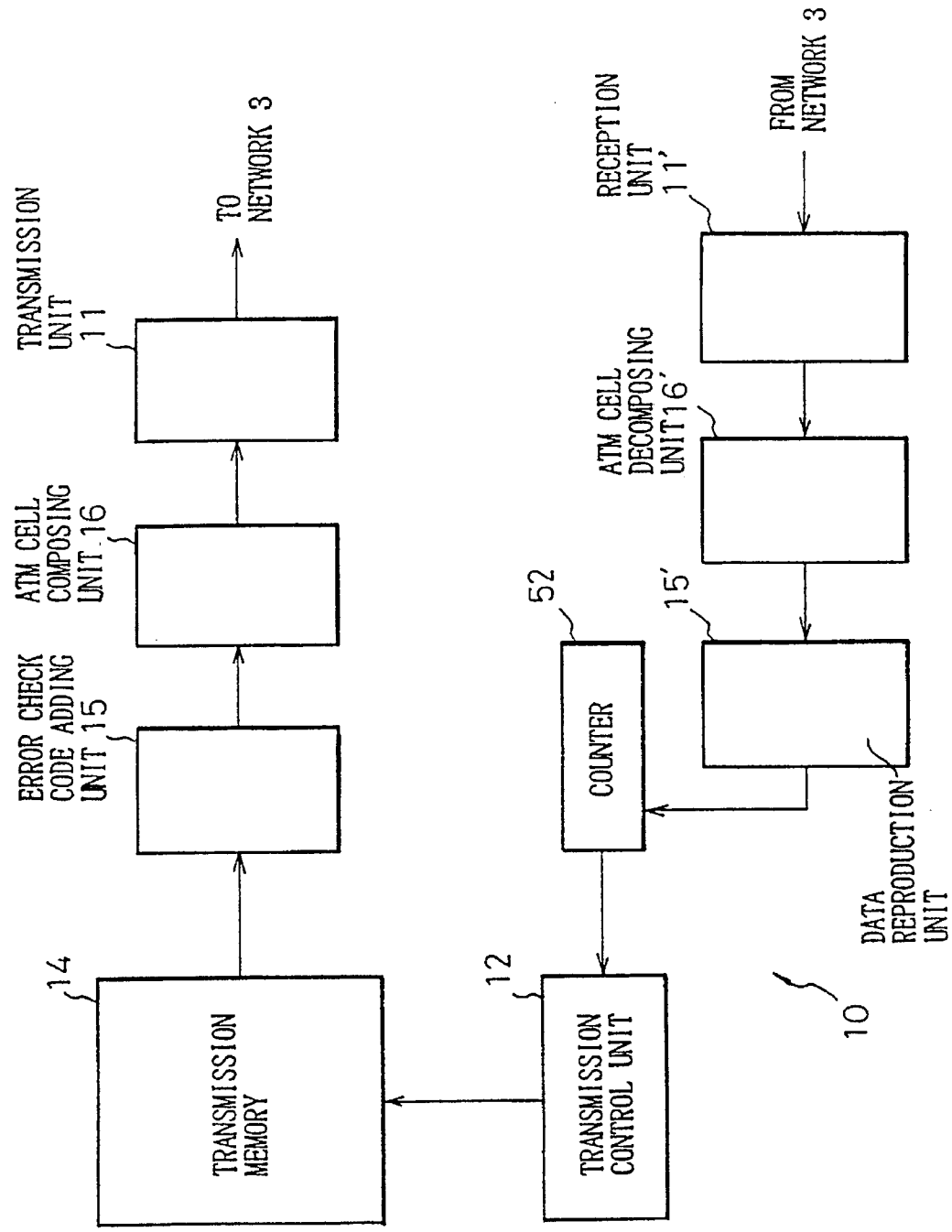
FIG. 10 is a view showing another specific example of the center office 1 side in the second embodiment of the present invention.

FIG. 10 is a view showing another specific example of the center office 1 side in the second embodiment of the present invention. The difference from FIG. 9 lies in the use of the counter 52. That is, the first means 10 shown in the figure includes a counter 52 which is preset with the number of the terminal equipment units 2 receiving the supply of information. The counter decrements the preset number with each reception of a call disconnect signal based on a call disconnect request from a terminal equipment unit 2 and is operative to stop the repeated transmission of the information when the count of the counter 52 becomes zero.

Figure 11:
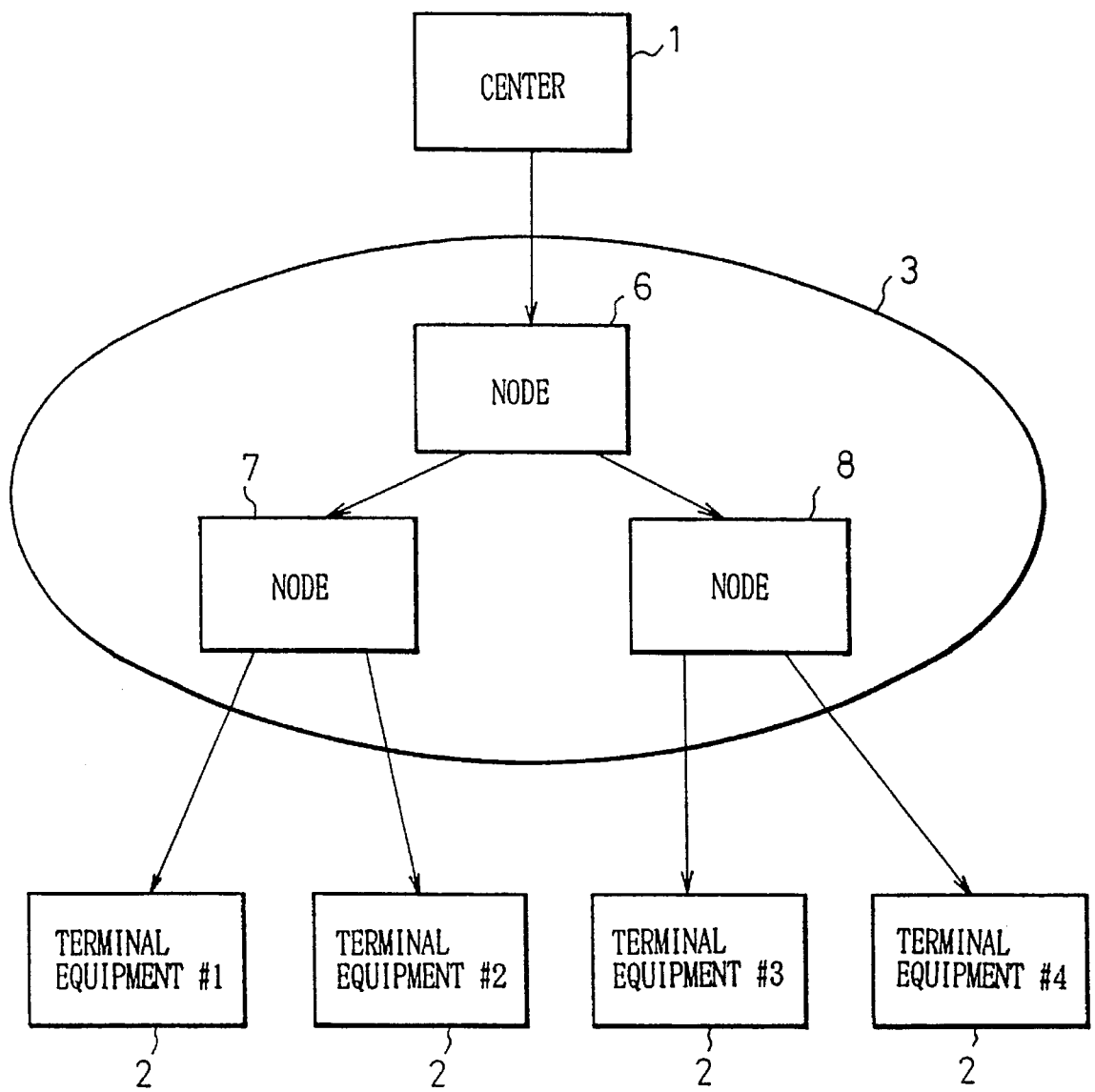
FIG. 11 is a view showing an example of the network construction used for explaining the second embodiment of the present invention.

FIG. 11 is a view showing an example of the network construction used for explaining the second embodiment of the present invention. This may also be applied to the first embodiment.

In FIG. 11, the center office 1 and the contractor terminal equipment units 2 are connected through a broadband ISDN network 3, for example. In the broadband ISDN network 3 are shown as an example the nodes 6, 7, and 8. The terminal equipment units #1 and #2 are connected to the center office 1 through the node 7 and the node 6. The terminal equipment units #3 and #4 are connected to the center office 1 through the node 8 and the node 6.

Referring again to FIG. 7, the contractor terminal equipment units 2 are each provided with an error detecting unit 21, a memory 23, and a call control unit 41. If no error was detected in the reception information cell at the error detecting unit 21, the reception information is written into the memory 23 and the call disconnect request is notified to the call control unit 41. The call control unit 41 sends a call disconnect signal as an ATM to the center office 1 through a node higher than the contractor terminal equipment unit 2 when receiving a call disconnect request. By this, information is no longer sent to the contractor terminal equipment unit 2 from the center office 1. The center office 1 continues repeatedly sending information to the other terminal equipment units where no call disconnection cells have been sent.

FIG. 12 is a view showing the state of broadcasting information to all terminal equipment unit; FIG. 13 is a view showing the state where information is received normally at the terminal equipment unit #1 and #3 and the call is disconnected; FIG. 14 is a view showing the state of broadcasting information only to the terminal equipment unit #2 and #4; FIG. 15 is a view showing the state where information is received normally at the terminal equipment unit #2 and the call is disconnected; FIG. 16 is a view showing the state of broadcasting information only to the terminal equipment unit #4; and FIG. 17 is a view showing the state where information is received normally at the terminal equipment unit #4 and the call is disconnected.

In FIG. 12, (1) A call is set up from the center office 1 to the terminal equipment units 2 of all the contractors.

(2) Information is transmitted from the center office 1.

In FIG. 13, (3) The terminal equipment units #1 to #4 of all the contractors receive the information from the center office 1. A judgement is made at the error detecting units 21 using the parity, CRC, etc. to determine if the information is correct or erroneous. Here, assume that the received information of the terminal equipment units #1 and #3 of the contractors is normal and the received information of the terminal equipment units #2 and #4 is erroneous.

(4) The contractor terminal equipment unit #1 fetches the reception data in the memory 23 and disconnects the call with the node 7. Further, the contractor terminal equipment unit #3 fetches the received information in the memory 23 and disconnects the call with the node 8.

In FIG. 14, (5) The same information is sent once more from the center office 1.

In FIG. 15, (6) The terminal equipment unit #2 for which the previous reception information was erroneous and which is still call connected receives the information from the center office 1 and judges if the information is normal or erroneous in the same way as before. Here, assume that the received information of the contractor terminal equipment unit #2 is normal and that the received information of the contractor terminal equipment unit #4 is erroneous.

(7) The contractor terminal equipment unit #2 fetches the received information in the memory 23 and disconnects the call with the node 7. The node 7 disconnects the call with the node 6 since all the calls of the terminal equipment units connected have been disconnected.

In FIG. 16, (8) The same information is sent once more from the center office 1.

In FIG. 17, (9) The terminal equipment unit #4 for which the previous received information was erroneous and which is still call connected receives the information from the center office 1 and judges if the information is normal or erroneous in the same way as before. Here, assume that the received information of the contractor terminal equipment unit #4 is normal.

(10) The contractor terminal equipment unit #4 fetches the received information in the memory 23 and disconnects the call with the node 8. The node 8 disconnects the call with the node 6 since all the calls of the terminal equipment units connected have been disconnected.

(11) The node 6 disconnects the call with the center office 1 since the call with the nodes 7 and 8 are disconnected.

(12) The center office 1 ends the transmission of information by the disconnection of the call with the node 6.

As explained above, according to the second embodiment of the present invention, there is no need for retransmission of information to all the contractors even if a reception error occurs for individual contractors. Further, there is no need for repeating the same information to all the contractors a number of times. By just repeating the same information to just the terminal equipment units of the contractors where the reception error has occurred until there is no longer any reception error, it is possible to lighten the load of the transmission processing at the center office and to have the terminal equipment units of the contractors receive the information from the center office reliably.

We claim:

1. An information broadcasting system, comprising:

a center office for providing information selectively read out from an information source storing various types of information;

a plurality of terminal equipment units for simultaneously receiving the same said information provided from the center office through a network in a point-to-multipoint configuration, first means, which is provided in the center office, for repeatedly transmitting to the terminal equipment units, information with an added error check code, without interposition of a protocol for confirming if said information had been provided normally to the terminal equipment units via respective calls set up in said network for each of said terminal equipment units; and second means, provided in each of the terminal equipment units, for receiving said information from said center office via the corresponding said call set up in said network and ending reception of said information after confirming, using said error check code, that the information has been normally received at the terminal equipment units without the interposition of a protocol for confirming if said information provided from the center office was received normally and promptly disconnecting the corresponding call with said center.

2. An information broadcasting system, comprising:

a center office for providing information selectively read out from an information source storing various types of information;

a plurality of terminal equipment units for simultaneously receiving the same said information provided from the center office through a network in a point-to-multipoint configuration, first means, which is provided in the center office, for repeatedly transmitting to the terminal equipment units, information with an added error check code, without interposition of a protocol for confirming if said information had been provided normally to the terminal equipment units via respective calls set up in said network for each of said terminal equipment units; and second means, provided in each of the terminal equipment units, for receiving said information from said center office via the corresponding said call set up in said network and ending reception of said information after confirming, using said error check code, that the information has been normally received at the terminal equipment units without the interposition of a protocol for confirming if said information provided from the center office was received normally, said first means successively reads said information with the added error check code, repeatedly transmits said information read a predetermined number of times, and stops transmitting said information when said information has been transmitted the predetermined number of times and promptly disconnecting the corresponding call with said center office said second means detects whether the information received includes an error, discards said information when said error is detected and receives next transmitted information.

3. An information broadcasting system as set forth in claim 2, wherein:

said first means receives said information composed of a plurality of blocks, and successively reads said information with the added error check code for each block of said plurality of blocks, repeatedly transmits said read information for each block a predetermined number of times, and stops transmitting said read information when said read information has been transmitted the predetermined number of times; and said second means includes a table for recording a state of reception, the state of reception indicative of whether an error exists for each block received and a table management unit for referring to said table and selectively receiving only blocks of said plurality of blocks, indicated by the table as having an erroneous reception state, from among said information received, while referring to said table.

4. An information broadcasting system as set forth in claim 3, wherein said first means comprises a transmission control unit which repeatedly reads out information from a transmission memory storing said information and a counter for causing the transmission control unit to repeatedly read said information, the predetermined number of times.

5. An information broadcasting system as set forth in claim 3, wherein said table displays, in a one-to-one correspondence, block numbers of said plurality of blocks, each block having a respective block number and reception state indication flags, each said reception state indication flag indicating whether the corresponding block was received without error and said reception state indication flags being successively renewed by said table management unit.

6. An information broadcasting system as set forth in claim 5, wherein said second means comprises a buffer which is coupled to the reception memory which stores the information to be supplied in correspondence with the blocks, for writing in the reception memory, said block information temporarily stored in the buffer when no error is detected in the received block information and the corresponding reception state indication flag indicates that the block information has not yet been normally received and discarding the block information when an error is detected in the received block information or the corresponding reception state indication flag indicates that the block information has been normally received.

7. An information broadcasting system as set forth in claim 6, wherein said second means comprises a reception control unit which controls at least said buffer and said table management unit.

8. An information broadcasting system having a reception error minimizing facility as set forth in claim 2, wherein said network is an ISDN network.

9. An information broadcasting system, comprising:

a center office for providing information selectively read out from an information source storing various types of information;

a plurality of terminal equipment units for simultaneously receiving the same said information provided from the center office through a network in a point-to-multipoint configuration, first means, which is provided in the center office, for repeatedly transmitting to the terminal equipment units, information with an added error check code, without interposition of a protocol for confirming if said information had been provided normally to the terminal equipment units via respective calls set up in said network for each of said terminal equipment units; and second means, provided in each of the terminal equipment units, for receiving said information from said center office via the network and ending reception of said information after confirming, using said error check code, that the information has been normally received at the terminal equipment units without the interposition of a protocol for confirming if said information provided from the center office was received normally, said second means comprising:

an error detecting unit which uses said added error check code to detect if said information has been normally received, and a call control unit which controls a setup of a call to be connected with the center office and which issues a call disconnect request to the call control unit when the error detecting unit indicates that said information has been normally received, so that the call connected with the center office is disconnected.

10. An information broadcasting system as set forth in claim 9, wherein said second means comprises a buffer coupled to a reception memory, for storing the information to be provided, and for writing the information stored in the buffer to said reception memory when the error detecting unit detects no errors in the information for discard the received information stored in the buffer when an error is detected in the information.

11. An information broadcasting system as set forth in claim 9, wherein said first means comprises a call state management table for recording flags indicating a presence of a call disconnection, in one-to-one correspondence with all of the plurality of terminal equipment units receiving the information, said first means rewriting the flag in the call state management table indicating completion of call disconnection when a call disconnect signal is received based on the call disconnection request from said terminal equipment unit.

12. An information broadcasting system as set forth in claim 9, wherein said first means comprises a counter which is preset with a count indicating how many of the terminal equipment units are receiving the information, said counter decrementing the count with each reception of a call disconnect signal, based on a call disconnect request from a corresponding terminal equipment unit, said first means stopping the repeated transmission of the information when the count of the counter becomes zero.

13. An information broadcasting system having a reception error minimizing facility as set forth in claim 9, wherein said network is an ISDN network.

14. An information broadcasting system having a reception error minimizing facility as set forth in claim 13, wherein said center office and plurality of terminal equipment units are connected through a plurality of nodes in said ISDN network.

15. An information broadcasting system having a reception error minimizing facility as set forth in claim 14, wherein each of said plurality of terminal equipment unit transfers a call disconnect signal, based on a call disconnect request, to successively higher nodes when detecting that the information has been received without error.

16. An information broadcasting system having a reception error minimizing facility as set forth in claim 13, wherein the call disconnect signal, based on a call disconnect request sent from said terminal equipment unit, is sent as an ATM cell.

17. An information broadcasting system, comprising:

read-out-means for providing information selectively read out from an information source storing various types of information at a central office;

repeatedly transmitting means for repeatedly transmitting a predetermined number of times, to terminal equipment units;

error check code adding means for transmitting said information including an added error check code via respective calls set up in a network for each destination terminal equipment unit allowing retransmission to stop as soon as normal reception of all packets is confirmed.

18. An information broadcasting system, comprising:

read-out-means for providing information selectively read out from an information source storing various types of information at a central office;

repeatedly transmitting means for repeatedly transmitting, a predetermined number of times, to terminal equipment units;

error check code adding means for transmitting said information including an added error check code via respective calls set up in a network for each destination terminal equipment unit until all of said terminal equipment units have received said information without a reception error.

19. An information broadcasting system according to claim 18, further comprising a call state management table for recording flags, each of said flags indicating whether a call disconnection is present for a corresponding terminal equipment unit of said terminal equipment units receiving information and for rewriting flags in the call state management table to indicate completion of call disconnections, a corresponding flag of said flags being rewritten when a corresponding call disconnect signal is received from the corresponding terminal equipment unit.

20. An information broadcasting system according to claim 18, further comprising a counter which is preset with a count which indicates how many of the terminal equiment units are receiving said information, for decrementing the count with each reception of a call disconnect signal from said terminal equipment unit and for stopping the repeated transmitting of said information when the count of the counter becomes zero.

21. An information broadcasting system comprising:

a network including nodes;

a center office for providing information; and a plurality of terminal equipment units, said nodes coupled between the center office and the plurality of terminal equipment units, and said nodes including lower nodes located at a terminal equipment unit side and higher nodes located at a center office side, said plurality of terminal equipment units receiving information repeatedly transmitted from said center office and transferring call disconnect signals based on a call disconnect request issued when the information has been normally received, each of said call disconnect signals corresponding to a terminal equipment unit of said plurality of terminal equipment units, said nodes receiving said call disconnect signals successively from the lower nodes and sending said call disconnect signals to the higher nodes when the terminal, said corresponding call disconnect signal received successively from a corresponding lower node and sending said corresponding call disconnect signal to a corresponding higher node when a corresponding terminal equipment unit coupled to the corresponding lower node outputs said corresponding call disconnect signal.

\* \* \* \* \*

UNITED STATES PATENT AND TRADEMARK OFFICE
CERTIFICATE OF CORRECTION

PATENT NO. : 5,613,065
DATED : March 18, 1997
INVENTOR(S) : Ishibashi et al.

It is certified that error appears in the above-indentified patent and that said Letters Patent is hereby corrected as shown below:

Cover Page, under "Other Publications", line 6, "chandran" should be --Chandran--;

Cover Page, under "Other Publications", line 11, "1701-170" should be --1701-1707--;

Col. 1, line 22, after "as" insert --,--;
Col. 1, line 34, delete "but";
Col. 3, line 59, after "code" insert --,--;
   Col. 5, line 12, "an" should be --a--;
Col. 11, line 25, after "office" inset --, and--.
   Col. 14, line 43, delete "," and insert "receives" and delete "received".

Signed and Sealed this

Tenth Day of March, 1998

Attest:

BRUCE LEHMAN

Attesting Officer ·     Commissioner of Patents and Trademarks